United States Patent [19]

Van Hook

[11] 4,009,332

[45] Feb. 22, 1977

[54] MEMORY MANAGEMENT SYSTEM FOR AN INK JET COPIER

[75] Inventor: Danny Allen Van Hook, Boulder, Colo.

[73] Assignee: International Business Machines Corporation, Armonk, N.Y.

[22] Filed: June 28, 1976

[21] Appl. No.: 700,631

[52] U.S. Cl. ............................ 358/280; 340/172.5; 346/75; 358/264

[51] Int. Cl.² .......................................... H04N 1/40

[58] Field of Search ............ 178/5, 6, 6.6 R, 6.6 A, 178/6.6 B, 6.7 R, 69.5 F; 346/75; 340/172.5

[56] References Cited

UNITED STATES PATENTS

| | | | |
|---|---|---|---|
| 3,689,693 | 9/1972 | Cahill | 178/6.6 R |
| 3,723,646 | 3/1973 | Behane | 178/6.6 R |
| 3,904,816 | 9/1975 | Taudt | 178/6 |
| 3,934,083 | 1/1976 | Plath | 178/6.6 R |
| 3,956,583 | 5/1976 | Pugsley | 178/6.6 R |
| 3,975,761 | 8/1976 | Taudt | 178/69.5 F |

*Primary Examiner*—Raymond F. Cardillo, Jr.
*Attorney, Agent, or Firm*—John B. Frisone

[57] ABSTRACT

An ink jet copier is provided with a document scanner which scans a document to be copied one line at a time producing non-coded binary data. The binary data is inserted in storage in a predetermined arrangement. Stored data is removed from selected predetermined locations in accordance with an algorithm and applied to a plurality of ink jet nozzles arranged in multiple linear arrays about the circumference of a rotating paper drum. The data signals selectively applied to the ink jet printers control the deposition of ink on the paper supported on the rotating drum to cause the reproduction of the original scanned image on a predetermined interlaced basis.

6 Claims, 11 Drawing Figures

MEMORY MANAGEMENT SYSTEM FOR AN INK JET COPIER

BACKGROUND OF THE INVENTION

1 Field of the Invention

The invention relates to copiers in general and more specifically to multiple nozzle ink jet copiers in which a plurality of ink jet nozzles are arranged in a plurality of linear arrays around the periphery of a rotating medium support drum and the scanned information from a document is prearranged in memory and later transferred to the linear arrays of nozzles at appropriate predetermined times to reproduce a copy of the scanned document on a medium supported on the drum.

2. Description of the Prior Art

Ink jet copiers in general generate digital information defining an image and applying the digital information either directly to an ink jet printer or printers or indirectly applying the same via a memory storage device which may or may not include rearrangement of the digital information. In those instances where multiple ink jet nozzles are employed, they may be arranged in a linear array parallel to the axis of a drum which supports the paper or other medium on which the image is to be formed. As the drum is rotated, the ink jet array is transported axially and the digital information is used to selectively control the ink jets to thus reproduce the image on the medium supported on the drum.

In those instances where multiple nozzle arrays are utilized, the images formed by each nozzle may follow interlaced spiral patterns on the medium. A perfect interlacing pattern is necessary to assure complete coverage and prevent double or multiple coverage of some areas on the medium. Several methods will provide such an interlace pattern of spirals.

The nozzle arrays may be fabricated such that the center to center spacing of the nozzles is made equal to the desired center to center spacing of the ink drops on the medium. This method provides automatic interlace, however, the required nozzle spacing is impractical if high printing resolution is required. Fabrication problems appear to render this solution unacceptable since the spacing, for any reasonable degree of resolution, is inadequate to accommodate the structural elements required to implement the required function.

Larger nozzle spacing in the array may be attained by angling the array with respect to the drum axis since the angling provides a closer axial drop spacing at the same time that it permits a larger nozzle spacing; however, this solution introduces a new problem. When the nozzle array is at an angle to the drum axis, the drops from the different nozzles in the array have different flight times due to the different distances to the drum surface. This produces varying degrees of drop misplacement depending on the number of nozzles and their spacing in the array. The problem of different flight times can be avoided by arranging the nozzles on a curved support plate which follows the drum contour so that all of the nozzles are equidistant from the drum surface. This solution is far from ideal since it requires a structure which is difficult to manufacture and align.

The nozzles and arrays may be staggered to provide additional space. However, this solution leads to additional problems in the areas of, driver uniformity, deflection when two or more rows are used, and guttering problems.

A more desirable solution would permit complete freedom on the center to center spacing of the nozzles which would allow a center to center nozzle spacing larger than the center to center spacing of the drops on the paper in the axial direction with negligible sacrifice of either printing speed or resolution. Such a solution would ease the fabrication of the nozzles and permit a much wider choice of existing nozzle technologies, such as glass drawn nozzle arrays or etched amorphous material arrays, all of which require substantial spacing. In addition, freedom of spacing minimizes problems in charge electrode packaging, guttering deflection systems and other problems related to electrical crosstalk are more readily solved.

SUMMARY OF THE INVENTION

The invention contemplates a multiple nozzle ink jet copier in which digital information signals representative of an image to be reproduced are received from a line scanner or the like. The signals are stored one line at a time in one of two temporary memories on an alternating basis under control of clocking signals supplied by a clock generator. The signals stored in the temporary memories are, under control of an address generator, stored in predetermined locations in a main memory. The address signals used for selecting the information signals to be stored and the locations in main memory for storing the selected signals are generated from the clock signals and are representative of line, nozzle and main memory work locations expressed as modular displacements from a reference. The information signals stored in the main memory are accessed under control of address signals generated by an output address generator means under control of the clock and a drum sync signal provided by the paper support drum system. The drum sync signal occurs $N_T$ times per drum revolution where $N_T$ is equal to the total number of nozzles in the nozzle arrays. The information signals read from the memory are stored in selected registers for controlling the associated ink jet nozzles. The nozzles are arranged in a plurality of linear arrays about the periphery of the paper support drum and provide an interlaced image on the paper when the drum is rotated and the nozzle arrays are simultaneously transported in an axial direction. The nozzles in the arrays are spaced $k$ resolution elements apart and the array advances $N_T$ resolution elements in the axial direction in each drum revolution.

DESCRIPTION OF THE PREFERRED EMBODIMENTS

Figure 1:
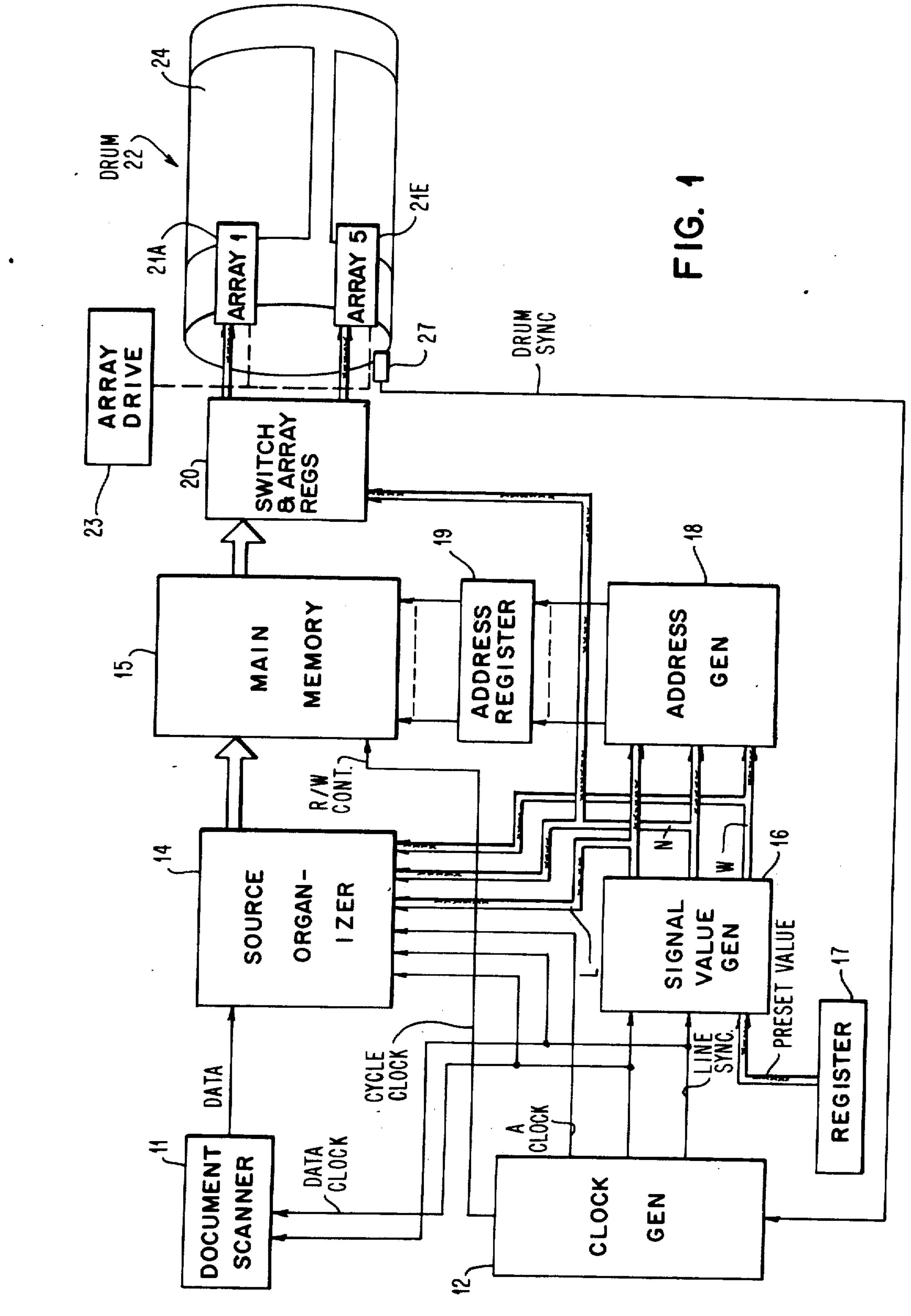
FIG. 1 is a block diagram of a complete ink jet copier constructed according to the invention.

FIG. 1 is a block diagram of an ink jet copier and includes a document scanner 11 arranged to scan a document which is to be copied. The document scanner 11 may take any form, preferably the document scanner should be arranged to scan serial horizontal lines in succession down the length of the document and provide a serial data stream indicative of the image content of the document on a line by line basis. Document scanner 11 is controlled by a line synchronizing clock signal generator 12. The line synchronizing signals cause the document scanner to scan one line at a time upon the occurrence of each of the line synchronizing signals. The data clocking signals provide the bit information. Typically, document scanner 11 will provide 40 lines in 257 mils of document length and the data clock will provide 1400 information bits in each of the scanned lines. The values set forth above are typical for an ink jet copier if constructed in accordance with the invention described in the specification. Obviously, these values may be varied over a wide range depending upon the resolution required in the copy.

Figure 6:
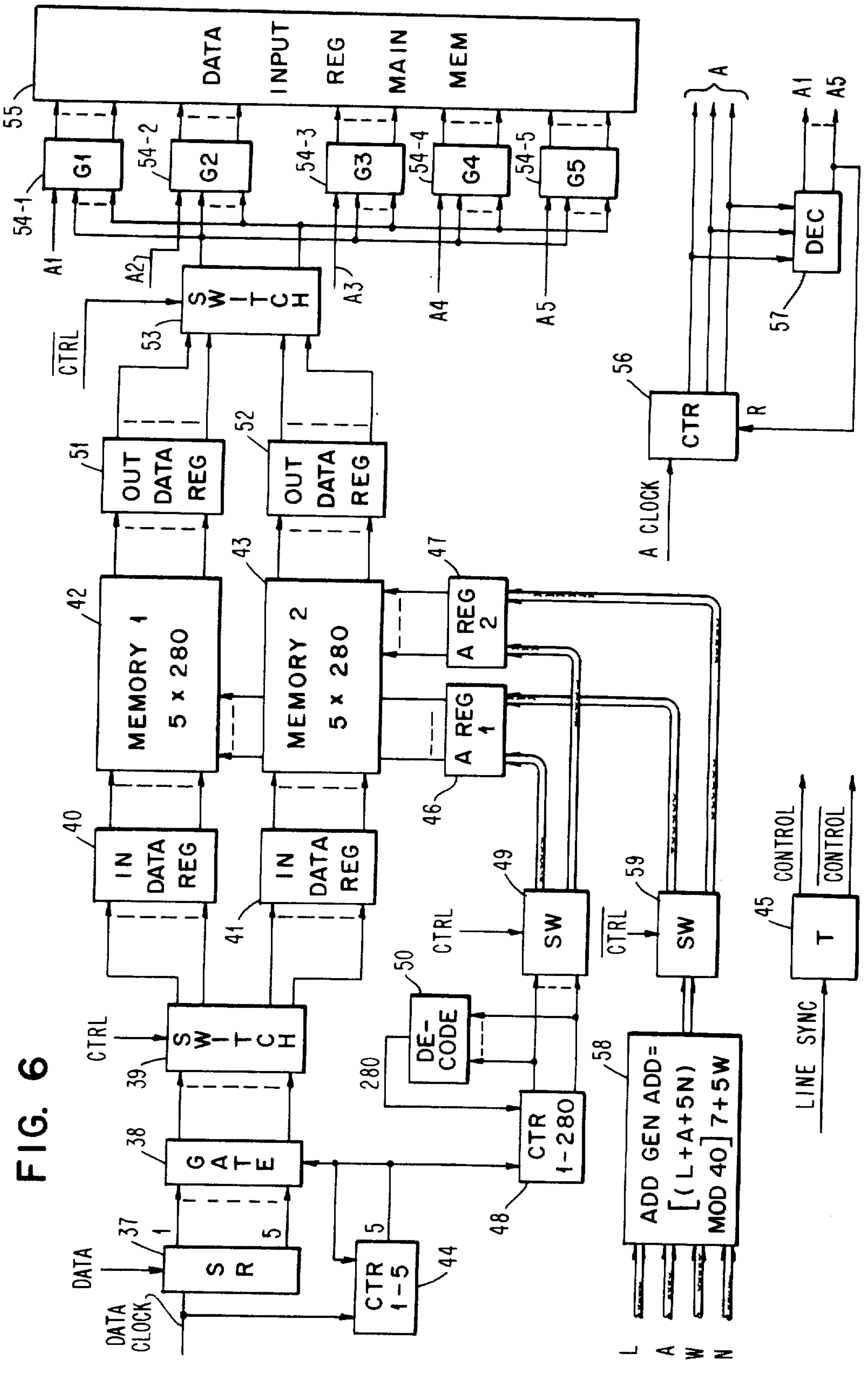
FIG. 6 is a detailed block diagram of the Source Organizer illustrated in FIG. 1.

The non-coded video data from the document scanner 11 is applied to the data input of a source organizer 14. The source organizer 14 performs several functions which will be described below. The details of source organizer 14 are illustrated in FIG. 6 and the detailed description of how source organizer 14 performs its function will be described in connection with the description of FIG. 6.

Source organizer 14 is provided internally with two memory areas. The successive lines of data from scanner 11 are stored in these two memory locations according to a predetermined scheme. The data on the first line, for example, is stored in the first storage location. After this data has been received, the data from the second line is stored in the second storage location. While the second line is being stored in the second location, the data previously stored in the first location is selectively inserted into the main memory 15. The source organizer 14 utilizes four control signals provided by clock generator 12 and three additional signals provided by a signal value generator circuit 16. In addition to the data clock and line sync signals applied to document scanner 11, source organizer 14 receives a cycle clock signal and an array clock signal A from the clock generator circuit 12. The three signals received from the input signal value generator circuit 16 are a line value labeled L, a nozzle value labeled N, and a word value labeled W. The signal value generator 16 receives the line sync and data clock signals from clock generator 12 and a preset value signal stored in a register 17. Input signal value generator 16 is illustrated in detail in FIG. 7, and a description of the operation of this circuit will be given in conjunction with the description of FIG. 7. The contents of register 17 represent misalignment of the paper or media 24 with respect to a mounting drum or media support 22 on which and with respect to which the image is generated. If no misalignment is present, the value stored in register 17 is zero.

The data stored in source organizer 14 is presented to the main memory 15 based on the input signals from clock generator 12 and signal value generator 16. The actual storage locations selected are determined by an address generator 18 which responds to the L, N and W signals from signal value generator 16 by generating the addresses within which the data presented by source organizer 14 will be located. Address generator 18 provides an output which is inserted in an address register 19 which actually controls the locations within main memory 15 where the data from source organizer 14 is inserted. Address generator 18 is shown in greater detail in FIG. 10 and will be described in conjunction with the description of FIG. 10.

The image data stored in main memory 15 is applied one word at a time via a switch 20 under control of the nozzle value N from signal value generator 16, to the arrays 21A through E. The stored signals control the nozzles associated with each of the five arrays, thus controlling the deposition of ink on the media mounted on the drum 22. The arrays are driven by an array drive 23 in an axial direction along the drum periphery. Thus, each nozzle describes a spiral about the drum selectively modulating the ink deposited by the nozzles as the nozzle array is driven axially and the drum is driven in a rotary direction which causes the image to appear on the media 24 mounted on the drum 22. The arrays 21A through 21E are shown in greater detail in FIG. 2A and FIG. 2B and will be described in conjunction with the descriptions of these figures.

Figure 7:
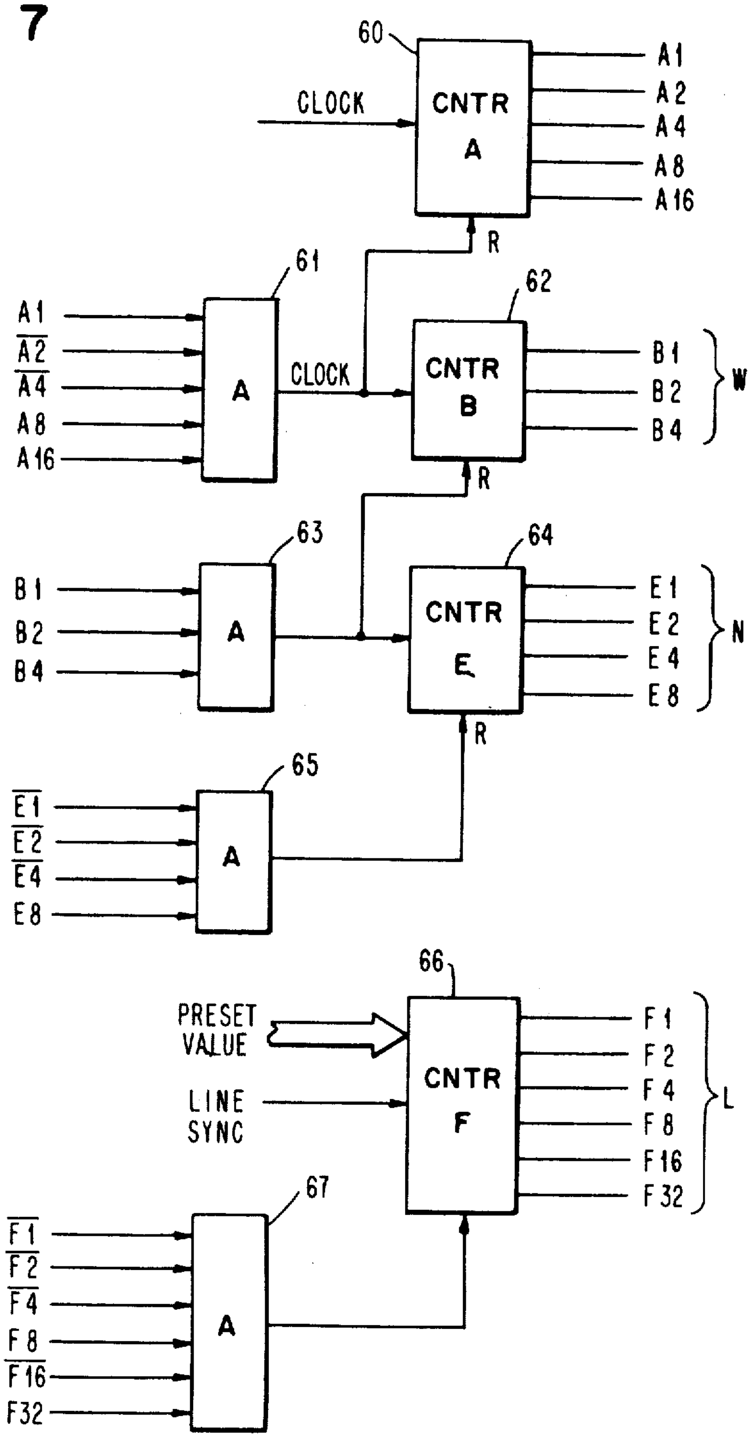
FIG. 7 is a detailed block diagram of the Signal Value Generator shown in FIG. 1.

A read/write control signal from clock 12 is applied to main memory 15; and as each memory address is generated by address generator 18, as described above, a read cycle is executed causing the contents of the memory location to be applied to the arrays as described above. The read cycle is followed by a write cycle in which the new image information is stored in the address indicated by address generator 18. This information will be supplied to the nozzle arrays the next time this address in main memory 15 is accessed. A drum sync signal is applied to clock generator 12 and causes the line sync signal issued therefrom to be synchronized to the drum sync signal, thus the data from document scanner 11 cannot fall behind or get ahead of the printing which occurred on the media 24. This prevents underruns and overruns of data in memory 15, thus reducing the required amount of storage. The details of output signal value generator 16 are illustrated in FIG. 7 and will be described in conjunction with the description of that figure. Switch 20 and the data registers associated with arrays 21A through E are shown in greater detail in FIG. 8 and will be described in conjunction with the description of that figure.

Figure 2:
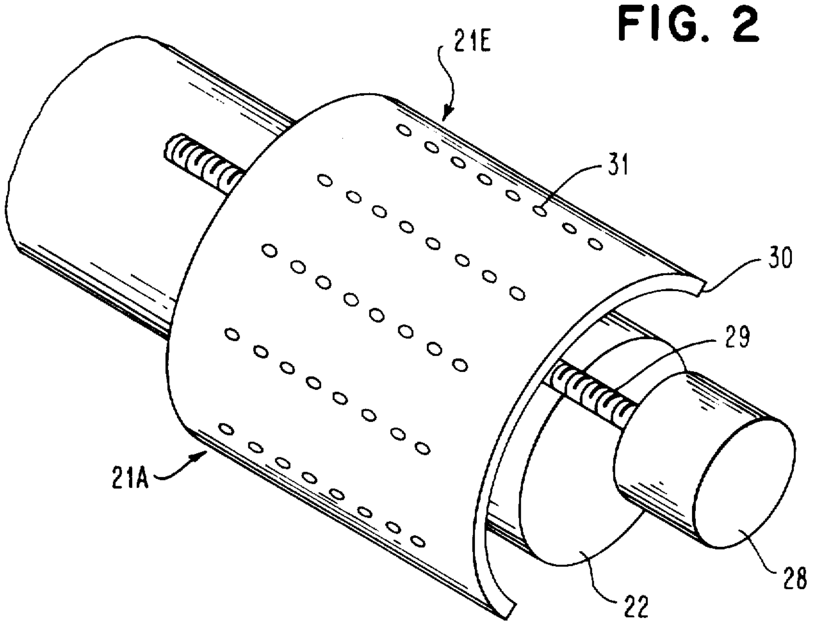
FIG. 2, comprised of FIGS. 2 and 2A, is a schematic diagram of the nozzle array and drum illustrated in FIG. 1.
Figure 2A:
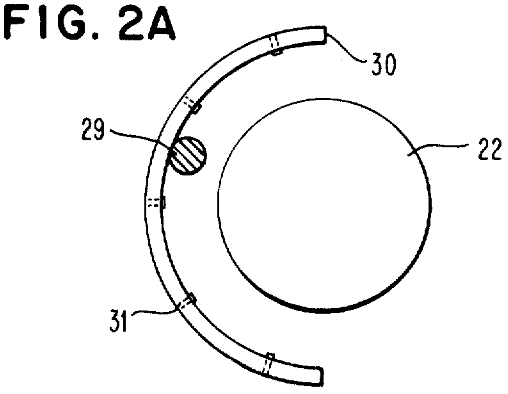

FIGS. 2 and 2A illustrate the drum, the array mountings and the array drive. The drum 22 is supported for rotation by structures not shown. Adjacent to the periphery of the drum is an array drive motor 28 which drives a lead screw 29. The array support 30 is mounted on the lead screw 29 and travels in an axial direction along the drum surface on the screw 29. Forty ink jet nozzles 31 illustrated schematically are supported on the array support 30. They are arranged in five linear groups of eight each. The details of the ink jet nozzles and the associated ink jet printer mechanisms have been intentionally deleted since conventional ink jet nozzles and ink jet printers may be utilized with this invention because the placement of the nozzles on the nozzles support 30 is substantially unrestricted. The specific nozzle arrangement described above is exemplary only. A large number of nozzle arrangements may be selected when the rules set forth below are followed.

According to the invention the center to center spacing of the nozzles in each of the arrays is virtually without restraint since adjacent nozzles are not required to cover adjacent segments of the circumference of the drum. Each of the circumferential lines around the drum is divided into equal length segments and the number of segments selected equals the total number of nozzles and the lines are spaced one resolution element apart. This criteria permits the spacing of the nozzles to be larger than the center to center spacing of the drops or the lines on the paper with a negligible sacrifice of either printing speed or resolution. In addition, it permits fabrication of nozzles using a much simpler process since spacing constraints may be eliminated. This consideration broadens the number of useful ink jet nozzle technologies available. For example, glass-drawn nozzle arrays or etched amorphous materials may be utilized since these are currently limited to larger spacings. In addition, the charge electrode packaging guttering deflection system and problems related to electrical cross talk become much easier to solve. The techniques described may be utilized in either single or multiple array copiers. Memory requirements, such as are present in the main memory 15, are minimized by using multiple arrays of nozzles positioned around the circumference of the drum as illustrated in FIG. 1, provided these are properly interlaced. This is due to the fact that the memory storage required is directly related to the axial length subtended by the arrays.

In considering the placement of nozzles in an array, two cases must be looked at, the single array and plural arrays spaced and around the drum periphery.

In a single array comprising N nozzles spaced k resolution elements apart, the criteria for interlace is as follows where N and $k$ are both integers.

1 The nozzle array must advance in the axial direction N resolution elements per single revolution of the print drum.

2 For $k$ factorable into prime factors such that $k = AxBx \ldots x\, M$, N must be an integer which has no prime factors in common with $k$, i.e., the fraction k/N must be irreducible.

In accordance with the above, the first nozzle prints, for example, segment 1 for a given scan line, the second nozzle segment $1+k$, the third $1+2k$, etc. in order for all segments to be printed with no overprinting of any segment, the first segment must not be reached again in the above sequence until $1+Nk$. Examples of $k$ and N combinations which will interlace are given below.

1 $k$=2, N includes the set of all odd integers.

2 $k$=3, N includes the set of all integers which are not multiples of 3.

3 $k$=4, N includes the set of all odd integers.

4 $k$=5, N includes the set of all integers which are not multiples of 5.

5 $k$=30 [2×3×5], N includes the set of all odd integers which are not multiples of 3 or 5. If the fraction $k$/N is reducible, the nozzle array will not interlace and double printing or missed areas will result.

The second case considered and illustrated in FIG. 1 and FIG. 2 is that of multiple arrays of plural nozzles. A multiplicity of M identical nozzle arrays having a total of $N_T$ nozzles are shown in FIG. 2. The nozzles are spaced $k$ resolution elements apart in the array. M, the number of arrays, N, the number of nozzles per array, and $k$, the multiple of the resolution elements are all integers. The criteria for interlace is as follows.

1. The nozzle transport must advance in the axial direction $N_T$ resolution elements per revolution where $N_T$ is the total number of nozzles.

2. The fraction $tk$/M divided by $t$N must be irreducible. The numerator and denominator must have no common prime factors. Factor t is the smallest integer between 1 and M, such that $tk$/M is also an integer (it follows that M/$t$ is also an integer). The value of $t$ required to satisfy the above expressions indicates the necessity of pairing of nozzle arrays. If $t$ equals 1, there is no constraint on the arrays as to pairings. If $t$ equals 2, the arrays must be even in number and paired in two groups displaced from each other by 180°. If $t$ equals 3, the number of arrays must be a multiple of three and arranged in three groups spaced 120° apart. In a multiple array where $t$ equals 2, the pairs of array groups must be spaced 180° apart; however, the spacings within each group will be dictated by other requirements, namely, where on the drum the array segments are to begin. This will be treated in greater detail when the specific embodiment disclosed is described.

An array arrangement may be selected according to the steps set forth below.

1. The desired value for $k$ is chosen to provide the desired resolution according to the expression 1/resolution = nozzle spacing/$k$.

2. Select the number of arrays desired M.

3. Solve the fraction set forth above to determine the value of t and the allowable number of nozzles N. Find the minimum t satisfying tk/M equals an integer and determine that the equation set forth above is irreducible.

4. For a mimimum print buffer or main memory requirement all arrays should be aligned in the axial direction to a common circumferential line as illustrated in FIG. 2. The arrays need not necessarily be axially aligned to a common circumferential line. In this case the axial alignment can be traded for spacing between arrays. However, if they are not aligned, interlacing will nevertheless occur but increased main memory will be required in all instances where information is being scanned and printed at the same time. The angular spacing for axially aligned arrays may be any multiple of 360°/$N_T$ which is not a multiple of 360° $xk/N_T$ from any other array where 360°/$N_T$ corresponds to one segment.

In the illustrated embodiment, five arrays, 21A through 21E, are used. Each of these arrays include eight nozzles 31. The nozzles in the arrays are spaced five resolution elements apart, thus the values given above are M = 5, $k$ = 5, N = 8, NT = 40. When these values are substituted in the equation given above, $t$ has a value of 1, thus the arrays are not paired and may be angularly spaced according to the description above. An angular spacing between arrays of 9° was selected. 9° of all the possible orientations was selected since it permits an easier visualization of operation. A selection of 54° is also an excellent choice since it provides adequate space between arrays for the ink jet nozzles hardware yet has adequate space opposite the arrays for installing paper handling equipment to permit paper to be automatically or manually added to the drum and removed.

Figure 3:
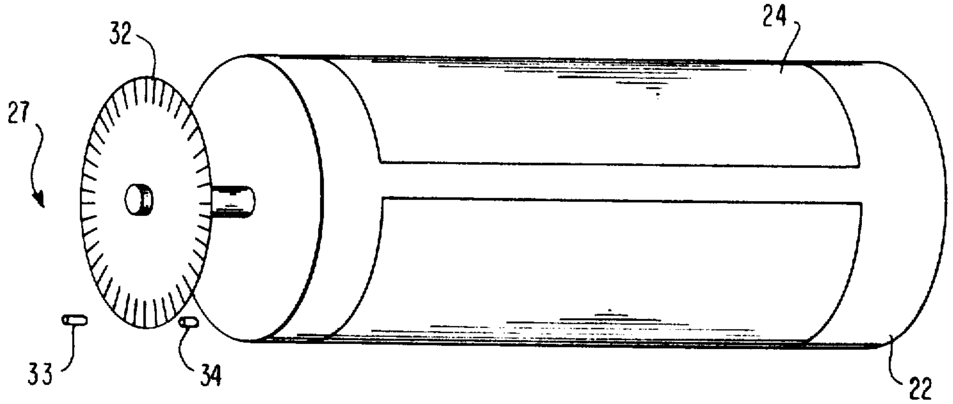
FIG. 3 is a perspective view of the drum shown in FIG. 1.

FIG. 3 illustrated the drum 22 with the paper 24 mounted on it and the drum sync generator 27. The drum sync generator includes the disc 32 having 40 scribed transparent lines therein arranged around the periphery of the disc. The disc 32 is attached to the drum 22 and rotates therewith between a light source 33 and a detector 34. When the light from source 33 is detected by the detector 34, the drum sync signal is provided by detector 34. This signal is applied to the clock generator circuit 12 illustrated in FIG. 1.

Figure 4:
FIG. 4 is a schematic diagram illustrating the segments and lines printed and identifies the various nozzles and arrays which print the various segments.

FIG. 4 illustrates 40 scan lines as reproduced on the drum. Each of the 40 scan lines includes 40 segments. The drawing in FIG. 4 is grossly distorted in order to present the information in a manner which is clearly understood. The 40 scan lines typically occupy 257 mils on the drum or paper mounted thereon. The drawing contains a series of numbers. The first digit of each of the double digit numbers represents the array number. The second digit of the double digit numbers represents the nozzle number within the array which produced the image in that particular segment. Each of the double digit numbers is coextensive with one of the segments. Thus, in the first scan line the first segment is produced by the first nozzle of the first array and the number is 11. The second segment of the first line is produced by the first nozzle of the second array. The third segment is produced by the first nozzle of the third array, the fourth segment by the first nozzle of the fourth array, and the fifth segment by the first nozzle of the fifth array. The second nozzle of the first array reproduces the sixth segment on the first scan line. The sequence continues throughout the scan line. The eighth nozzle of the fifth array reproduces the first segment of the second scan line and all of the other nozzles in arrays are displaced one segment to the right. Subsequent lines are produced in the same manner with the segments produced by the nozzles precessing to the right and moving back to the left when the 40th segment was done on the preceding line. The entire pattern illustrated occupies a single revolution of the drum. On a subsequent revolution of the drum another 40 scan lines are produced. The 40 lines illustrated in FIG. 4 are, as previously stated, distorted and only occupy approximately 257 mils of space in the vertical direction on the paper on which the image is being produced. The width, however, is substantially as illustrated in FIG. 4. A complete page, of course, will require many reproductions one after the other of the 40 lines illustrated in FIG. 4.

Figure 5:
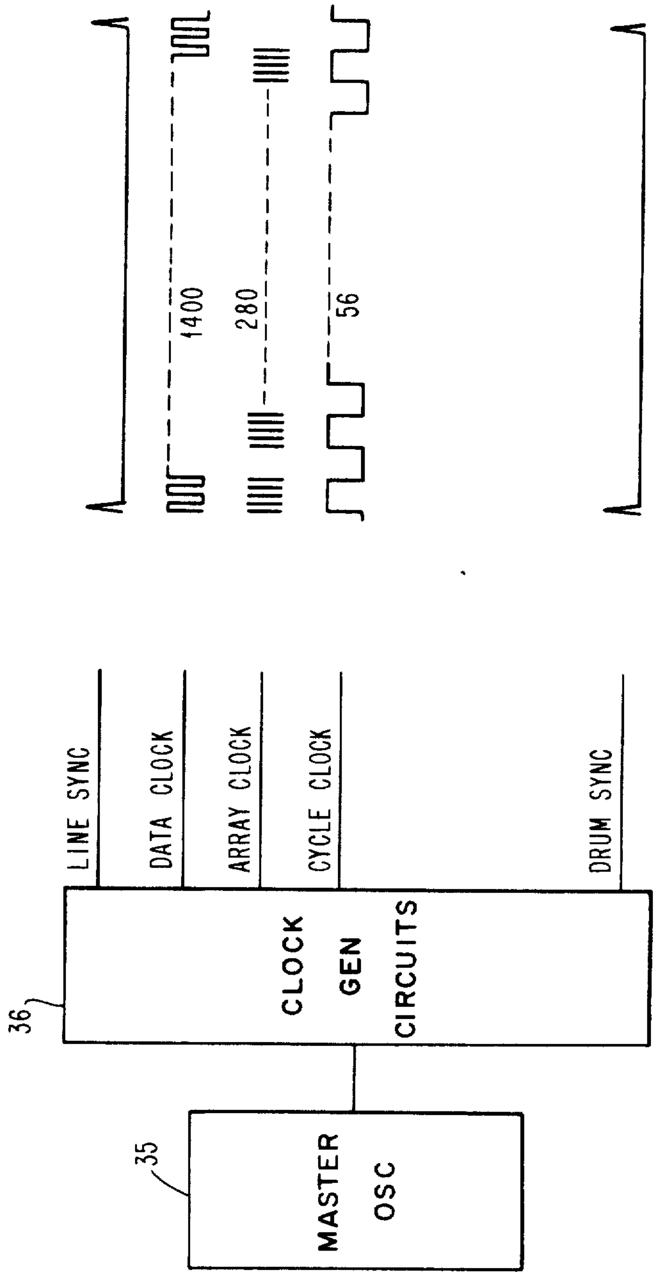
FIG. 5 is a schematic diagram of the clock shown in FIG. 1 and includes graphical representations of the outputs from the clock.

FIG. 5 is primarily intended to illustrate the outputs from clock generator 12 shown in FIG. 1. The clock includes a master oscillator 35 and the necessary counting and logic circuits 36 for producing the four outputs illustrated in response to the drum sync signal supplied by the drum sync generator 27 of FIG. 1. The details of clock 12 are not illustrated here because conventional circuits may be utilized for providing the clock signals illustrated in FIG. 5. These, typically, will include counting circuits, logic circuits, differentiators and integrators for operating on the pulses from the master oscillator 35 to provide the outputs illustrated in FIG. 5.

The drum sync signal from drum sync generator 27 is provided once per one-fortieth revolution of the drum 22. This signal causes the issuance of the line sync signal from clock 12, thus the line sync signals are produced substantially coextensively with the drum sync signal. 1400 data clock signals are produced between each line sync signal to thus provide the 1400 bits per scan line previously referred to. In addition, the period between line sync signals includes 56 cycle clocks. The cycle clock signals may or need not necessarily be symmetric. If the two processing times for the source organizer 14 are symmetric, then the signal may be symmetric. However, if the reading operation requires more time than the writing operation, this may be accommodated by making the cycle clock signal asymmetric within each of the 56 cycles. The array clock signal includes five pulses during the positive cycle of each of the cycle clock cycles yielding 280 pulses between successive line sync signals.

The source organizer 14 of FIG. 1 is illustrated in greater detail in FIG. 6. The data signals from the scanner 11 are applied to a shift register 37 and shifted in under control of the data clock signal from clock 12. Shift register 37 stores five bits and is provided with five parallel outputs which are applied via a gate circuit 38 and a switching circuit 39 to one or the other of two input data registers 40 and 41 associated with random access memory cells 42 and 43 respectively. The data signals are shifted into shift register 37 under control of the data clock signals from clock 12. In addition, the data clock signals are applied to a 1–5 counter 44. At the count of five, counter 44 provides a signal which enables gate 38 and resets counter 44. When gate 38 is enabled, the contents of shift register 37 are applied in parallel to switch 39. Depending on the state of the control signal, the contents of shift register 37 are applied to either input data register 40 or input data register 41. The control signal applied to switch 39 is generated by a trigger circuit 45 which is toggled by the line sync signal from the clock 12. Thus, the control output from trigger 45 changes state with each line sync signal. During one line period the contents of shift register 37 are applied successively each five bit period to input data register 40 whereas during the next line period the contents are applied serially five bits in parallel to input data register 41.

The contents of input data registers 40 or 41 are stored in memories 42 and 43 respectively at locations defined by the contents of address registers 46 and 47 respectively. The actual address inserted in either register 46 or 47 depending upon the state of trigger 45 is generated by a counter 48 which responds to the output of counter 44. Counter 48 counts from 1 to 280 since 280 is the maximum number of addresses required in memories 42 and 43. This quantity will accommodate 1400 bits in a single scan line since 280 addressable positions each containing five bits equals the 1400 bits per line stored. The output of counter 48 is applied via a switch 49 to either register 46 or 47 depending upon the state of the control signal from trigger 45. When the control signal occupies one state the contents of counter 48 will be inserted in register 46 and when the control signal occupies the opposite state the contents will be inserted in register 47. Registers 46 and 47 and 40 and 41 operate in synchronism under control of the control signal from trigger 45 to cause the contents of the scanned line to be inserted alternately in memories 42 and 43. A decoding circuit 50 responsive to the output of counter 48 decodes the count of 280 and resets counter 48 so that it is prepared to process the next scanned line. This completes the description of FIG. 6 insofar as receiving data from the scanner and inserting the received data into the memories 42 and 43 on an alternating line basis. The remainder of the description which follows will be concerned with removing the contents from memories 42 and 43 and inserting those contents in the appropriate places in main memory 15.

The contents of memories 42 and 43 are made available in output data registers 51 and 52 respectively. Memories 42 and 43, depending upon the particular type selected, may be controlled by the output of trigger circuit 45 as to which will be in a read and which will be in a write cycle since these cycles are opposite at any given time for the two memories, i.e., when the data from the line scanner is being stored in memory 42, the contents of memory 43 which represent the data from the previous scan line will be read out into register 52 and inserted as will be described below in main memory 15. Output registers 51 and 52 are connected by a switch 53 and five gates 54-1 through 54-5 to a data input register 55 associated with main memory 15. The operation and function of gates 54-1 through 54-5 will be described below.

The A clock signal from clock 12 is applied to a counter 56 which counts 1 through 5 and is reset. The outputs illustrated of counter 56 provide an indication of the count. These are labeled A and will be used elsewhere in this circuit and described later on. These outputs are also applied to a decoder circuit 57 which decodes the actual count A-1 through A-5 and resets the counter 56 following the occurrence of the A-5 count. The outputs of decoder 57, A-1 through A-5, are applied to the gates 54-1 through 54-5, respectively, thus the first five bits from memory 42 or memory 43 are applied via gate 54-1 to the first five positions of the input register 55. The second group of five bits are applied via gate 54-2 to the second five bit positions in input data register 55, etc. until the last group of five bits are inserted in the last five positions of input register 55. Referring back to FIG. 5, it should be noted that the A clock or array clock contains five pulses in one-half of the cycle clock period. This is necessary since five addresses in memories 42 or 43 must be processed during one clock cycle period because the word length in main memory 15 is 25 bits and that in memories 42 and 43 is five bits. Thus, the contents of five addresses in memories 42 or 43 are assembled in the input data register 55 during each cycle clock for later insertion into memory 15. These are assembled under control of the counter 56 and decoder 57.

An address generator 58 receives the output from counter 56, the L, N, and W outputs from signal value generator 16 and computes the address as indicated in the expression in the drawing. The computed address is applied via a switch 59 under control of the $\overline{\text{control}}$ output from trigger 45 to either register 46 or 47 depending upon the state of trigger 45. It should be noted that the address from counter 48 and the address from generator 58 will be applied to different registers 46 and 47 because the control signals from trigger 45 are of opposite states and are applied to switches 49 and 59 respectively. Thus, data will be written into one memory while it is being removed from the other memory and the roles will reverse with each successive line sync signal. The implementation of address generator 58 should be obvious to those skilled in this art. Typically, this address generator will be constructed from conventional solid state circuits to specifically provide the output indicated from the inputs provided. A general purpose computer could be used. However, the speed required and the limited function required would militate in most instances against such a choice.

FIG. 7 is a detailed diagram of the signal value generator 16 illustrated in FIG. 1. The data clock signals are applied to an A counter 60 which is provided with five counting stages having paired outputs A1, A2, A4, A8 and A16. The outputs of A1, $\overline{A2}$, $\overline{A4}$, A8 and A16 are applied via an AND gate 61 to the reset input of counter 60. Thus, counter 60 resets after counting 25 data clock pulses. This corresponds to the number of bits in a word in main memory 15. The output of AND gate 61 is connected to a B counter 62 which has three stages to provide word count W which ranges from 1 through 7 or, stated differently, 0 through 6. The outputs B1, B2 and B4 of B counter 62 are connected to and AND gate 63 which has its output connected to the reset input counter 62. The output of AND gate 63 is also connected to an E counter 64 which has four stages, the outputs of which are labeled E1, E2, E4 and E8. These constitute the nozzle value N, the outputs $\overline{E1}$, $\overline{E2}$, $\overline{E4}$ and E8 are connected to an AND gate 65 which has its output connected to the reset input of counter 64 which counts to 8, and resets, thus providing an output indicative of the eight nozzle values.

The preset value stored in register 17 of FIG. 1 is applied to preset an F counter 66. The line sync signals from the clock 12 of FIG. 1 are applied to the step input of counter 66 which has six stages and provides the line count L. The $\overline{F1}$, $\overline{F2}$, $\overline{F4}$, $\overline{F8}$, $\overline{F16}$ and F32 outputs of counter 66 are applied via an AND gate 67 to the reset input of counter 66. Thus, counter 66 counts from 1 through 40 to indicate which of the 40 scan lines are being processed. Obviously, many more than 40 lines are processed. However, they are treated as groups of 40 by the circuits described above.

Figure 8:
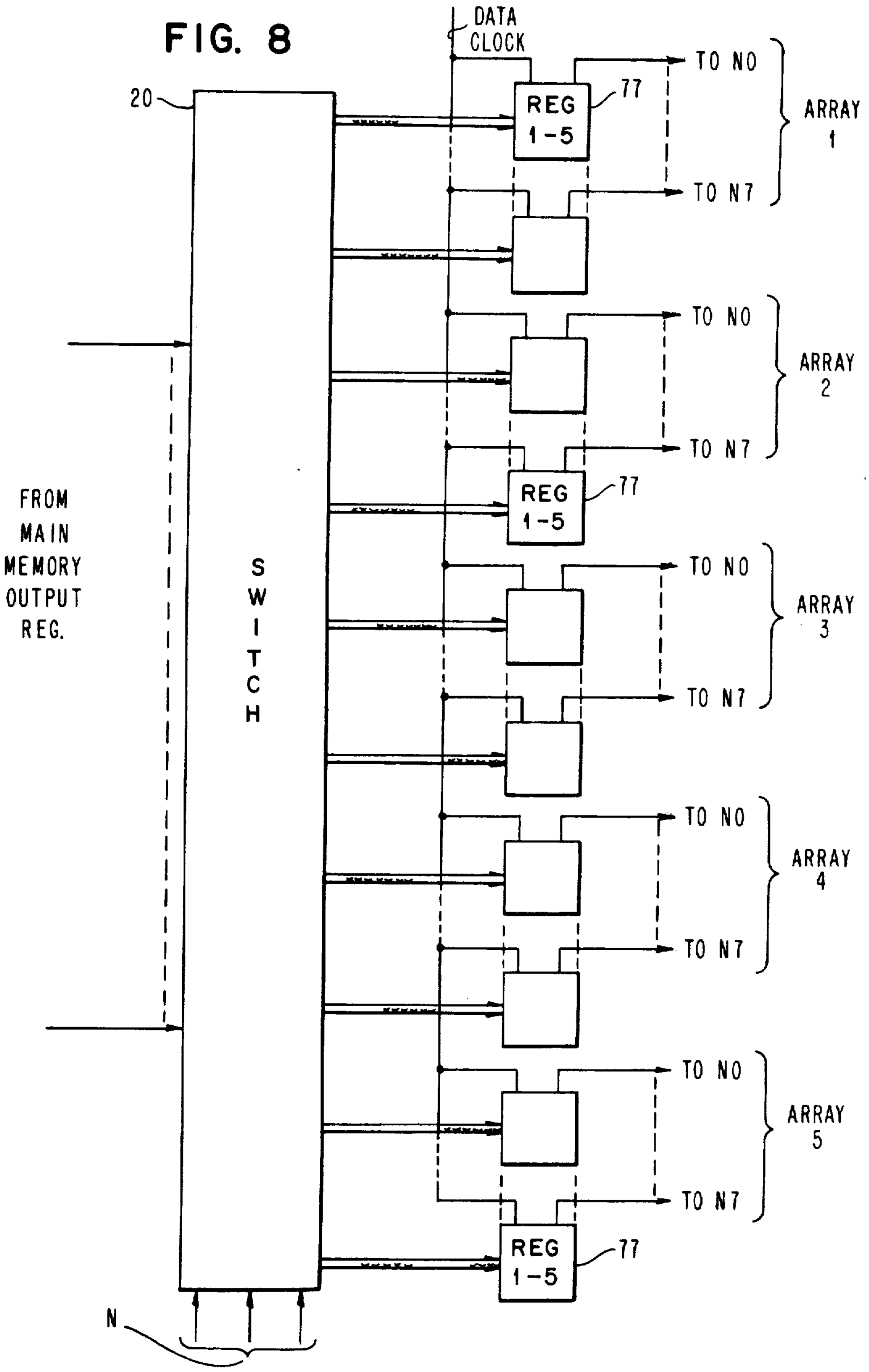
FIG. 8 is a block diagram of the array registers and switch shown in FIG. 1.

FIG. 8 illustrates some of the details of the arrays 21A through 21E and the relationship of switch 20 thereto. Switch 20 is connected to the output register associated with main memory 15 and receives 25 bits in parallel therefrom. In addition, it receives the N signal from signal value generator 16. Each of the arrays 21 includes 8 nozzles N0 through N7. Associated with each of the nozzles is a register 77. There are in total 40 such registers. The 8 registers 77 associated with the first array are connected in parallel to the first five bit positions from the output register of main memory 15 via switch 20. They are selectively connected under control of the N signal from signal value generator 16. The 8 registers 77 associated with array 2 are connected to the 6th through 10th bit positions of the output register of memory 15 via switch 20 under control of the N signal from value generator 16. In a similar manner the 8 registers associated with each of the third, fourth and fifth arrays are connected to the next succeeding groups of five bits from the output register of main memory 15 via switch 20 under control of the N signal from signal value generator 16. Registers 77 are loaded in parallel via switch 20 and the data contained therein is shifted out in serial fashion under control of the data clock signal to the connected nozzles as indicated in the drawing.

Figure 9:
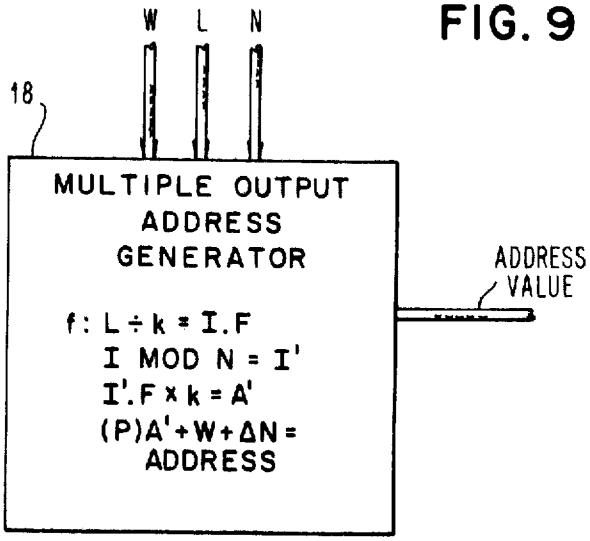
FIG. 9 is a block diagram of the Address Generator illustrated in FIG. 1.

FIG. 9 illustrates in greater detail address generator 18. The physical details of multiple output address generator 18 are not shown since they may be constructed from standard components to perform the functions outlined in algebraic form within the box.

Three intermediate computations are illustrated in the box. In the first intermediate computation the line value L is divided by $k$ to provide a whole number I and a fraction F.

The whole number I is multiplied by Mod N to yield a value I'. The value I' and the fractional part F from above yield a value I'.F which is multiplied by $k$ to yield a value A'. The value A' indicates the starting address for each nozzle group. This value is, however, an intermediate value which is multiplied by a constant P (=7=number of words/segment) summed with the word value W and a value ΔN to yield the actual address where data is retrieved or placed depending on which portion of the cycle clock is active (read or write).

The values R, Mod N and ΔN are computed in advance and stored in the multiple output address generator 18 for each nozzle. The table below is predicated on a value of $k$=5 and $R_N$ indicates the number of storage locations in memory 15 allocated for a nozzle.

| Nozzle No. | $R_N$ | Mod N | $R_N \times 7$ | ΔN |
|---|---|---|---|---|
| 1 | 5 | 1 | 35 | 0 |
| 2 | 10 | 2 | 70 | 35 |
| 3 | 15 | 3 | 105 | 105 |
| 4 | 20 | 4 | 140 | 210 |
| 5 | 25 | 5 | 175 | 350 |
| 6 | 30 | 6 | 210 | 525 |
| 7 | 35 | 7 | 245 | 735 |
| 8 | 40 | 8 | 280 | 980 |

The remaining values described above are provided by the circuits previously described. The values of Mod N and ΔN may be stored in a read only memory at addresses corresponding to nozzle number values which are provided by the previously described circuits. While a programmed general purposed computational device may be used for multiple address generator 18, a more desirable choice would be hard wired logical circuits for performing the described function since the speed of computation required would be more easily and economically achieved.

Figure 10:
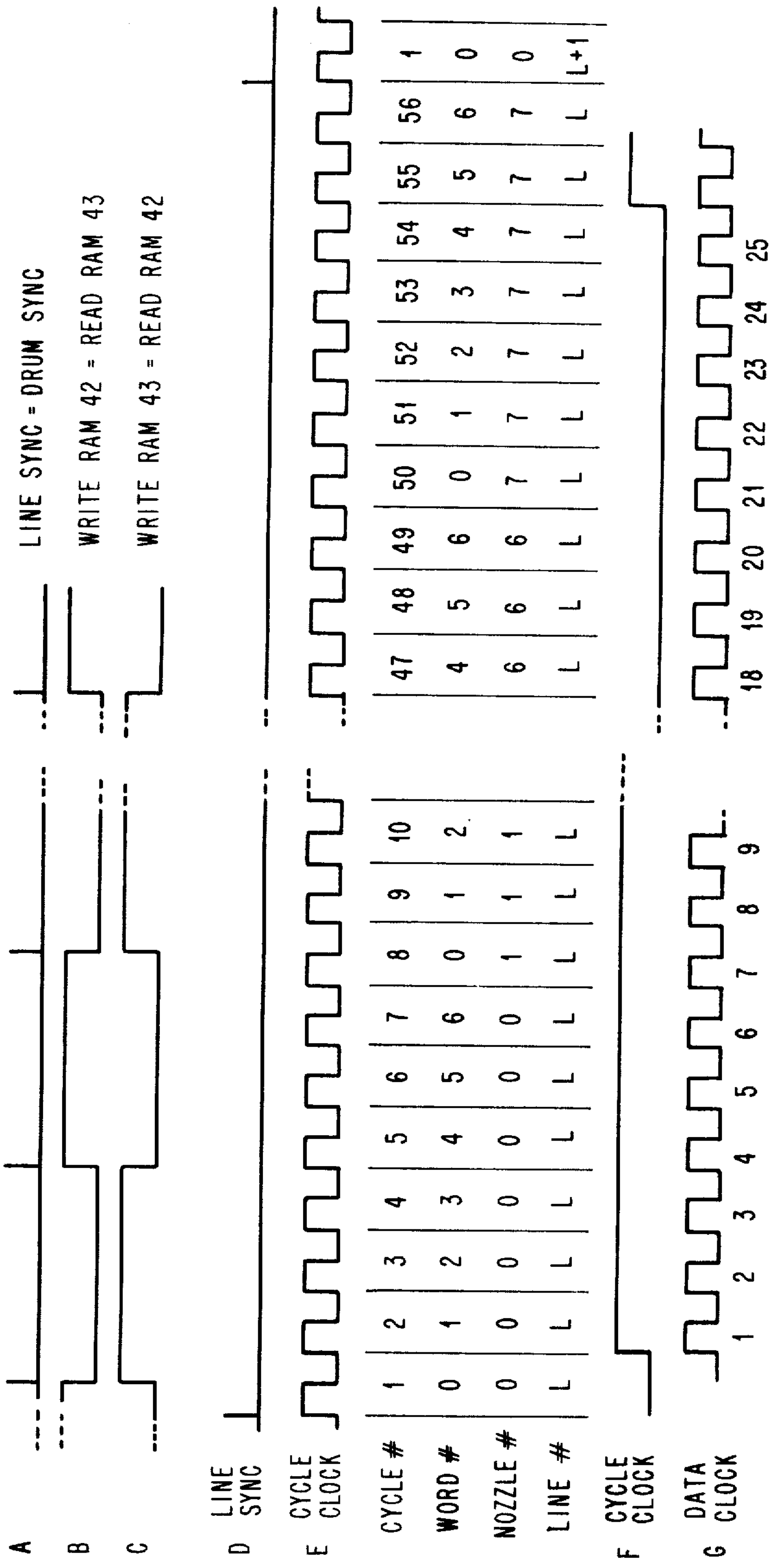
FIG. 10 is a graphical representation of timing relationships utilized in the circuits illustrated.

The graphs and table in FIG. 10 illustrate the various timing relationships and the sequence of events in the circuits described above. Graph A illustrates several cycles of the line and drum sync signals. Graphs B and C illustrate read/write sequences for random access memories (RAM) 42 and 43. Graph D illustrates a signal line sync period and graph E illustrates the fifty-six cycle clock periods occurring therein. The table immediately below graph E illustrates graphically the occurrence of various values during the different cycles of the cycle clock sequence. The indicated sequences are repeated. The word number goes from 0–6 and repeats. It ends on 6 at the 56th cycle of the cycle clock. The nozzle number stays at 0 for seven cycles and increments to 1 where it stays for seven cycles. Thereafter it increments to 3 and increments every seven cycles. The line number increments at line sync and remains at that value till the next line sync. Graph F shows a single cycle of the cycle clock and graph G shows the data clock during that cycle.

While the invention has been particularly shown and described with reference to a preferred embodiment thereof, it will be understood by those skilled in the art that various changes in form and details may be made therein without departing from the spirit and scope of the invention.

What is claimed is:

1. A data handling and storage system for connecting the video data output of a document line scanner to a document printer which includes a plurality (N) of print elements arranged to traverse a media simultaneously in two substantially orthogonal directions and in which the video data derived from the scanner is used to selectively modulate the printing elements to reproduce the scanned document on the media comprising:

clock means responsive to positional information from said document printer for providing first control signals one of which is supplied to the document scanner for controlling the scannning rate thereof;

signal generator means responsive to the first control signals for providing second control signals (L), (W) and (N), each of which is a predetermined multiple of the first control signals;

a source organizer means responsive to said first and second control signals and including, first means responsive to first control signals for storing alternate scan line data in first and second memory means each in a predetermined sequence, second means responsive to first and second control signals for alternately reading stored signals from said first and second memories as a predetermined function of the values of the said first and second control signals, said first and second means controlling said memories at different times to provide insertion of signals in one memory under control of said first means and reading of signals from the other memory under control of said second means on a concurrent basis and vice versa;

main random access memory means responsive to the first and second control signals for alternately reading data signals stored in addressable memory locations determined by the value of said first and second control signals and providing the said signals to the document printer for controlling selected print elements and for storing the data signals read by the said source organizer in addressable memory locations determined by the values of said first and second control signals; and gating means responsive to said (N) control signal for selectively connecting the signals supplied by said main memory when read to selected printed elements.

2. A data handling and storage system as set forth in claim 1 in which:

said plurality of print elements are arranged in a plurality of equal arrays arranged parallel to one of the directions of movement; and said clock means responsive to positional information from said document printer for providing first control signals includes;

a first signal (S) which is applied to the line scanner and causes the scanner to scan a line on the document, a second signal (C) which includes a fixed number of clock pulses within each line scan and is used by the scanner to generate a data signal, and a third signal (A) which occurs repetitively within the (S) signal and is a function of the number of arrays of printing elements.

3. A data handling and storage system as set forth in claim 2 in which said second control signals (L), (W) and (N) have the following significances:

L. is a line signal and corresponds to the scan line number on a modulus equal to the total number of print elements ($N_T$);

W. is a word number and is related to the word size in the main memory and varies between 1 and n where n is equal to the number of words in the main memory required to store one segment of data signals for one print element in each array and each line includes one segment per print element; and N. is a print element number which varies between one and n where n is the maximum number of print elements per array (a) and the print element member (N) changes value on the modulus of the word value (W).

4. A data handling and storage system as set forth in claim 3 in which the said source organizer includes:

a serial to parallel converter means for receiving the serial image data signals from the scanner and periodically providing a fixed number of sequentially received bits in parallel, the number of parallel bits provided corresponding to the word size of the said first and second memory means;

switching means responsive to the said (S) signal for connecting the provided parallel output of the converter alternately to the said first and second memory means on alternate (S) signals which correspond to alternate scanned lines;

first address generator means responsive to said (C) signals for generating sequential addresses for storing the provided parallel output of the converter;

second address generator means responsive to the said (L), (A), (W) and (N) signals for generating a sequence of predetermined addresses on a modulus ($N_T$) from which image data signals are to be read from the said first and second memories;

second switching means responsive to the said (S) signal for applying the address supplied by the first and second address generators simultaneously to the first and second memory means, respectively, and alternating the connection with each said succeeding (S) signal; and third switch means responsive to the said (S) signal and operating in opposite phase to said first switch means for connecting the contents of the first and second memory means then being read under control of the said second address generator to the main memory means.

5. A data handling and storage system as set forth in claim 4 in which said gating means responsive to said (N) control signals includes a plurality of multiple bit data registers, one for each print element, for receiving selected data signals from each word in main memory under control of the said (N) signal and providing said data signals one bit at a time to the print elements under control of the said (C) signal.

6. A data handling and storage system as set forth in claim 5 in which one predetermined register associated with each array is loaded with data bits each time a word in main memory is read.

* * * * *